Patented Apr. 28, 1925.

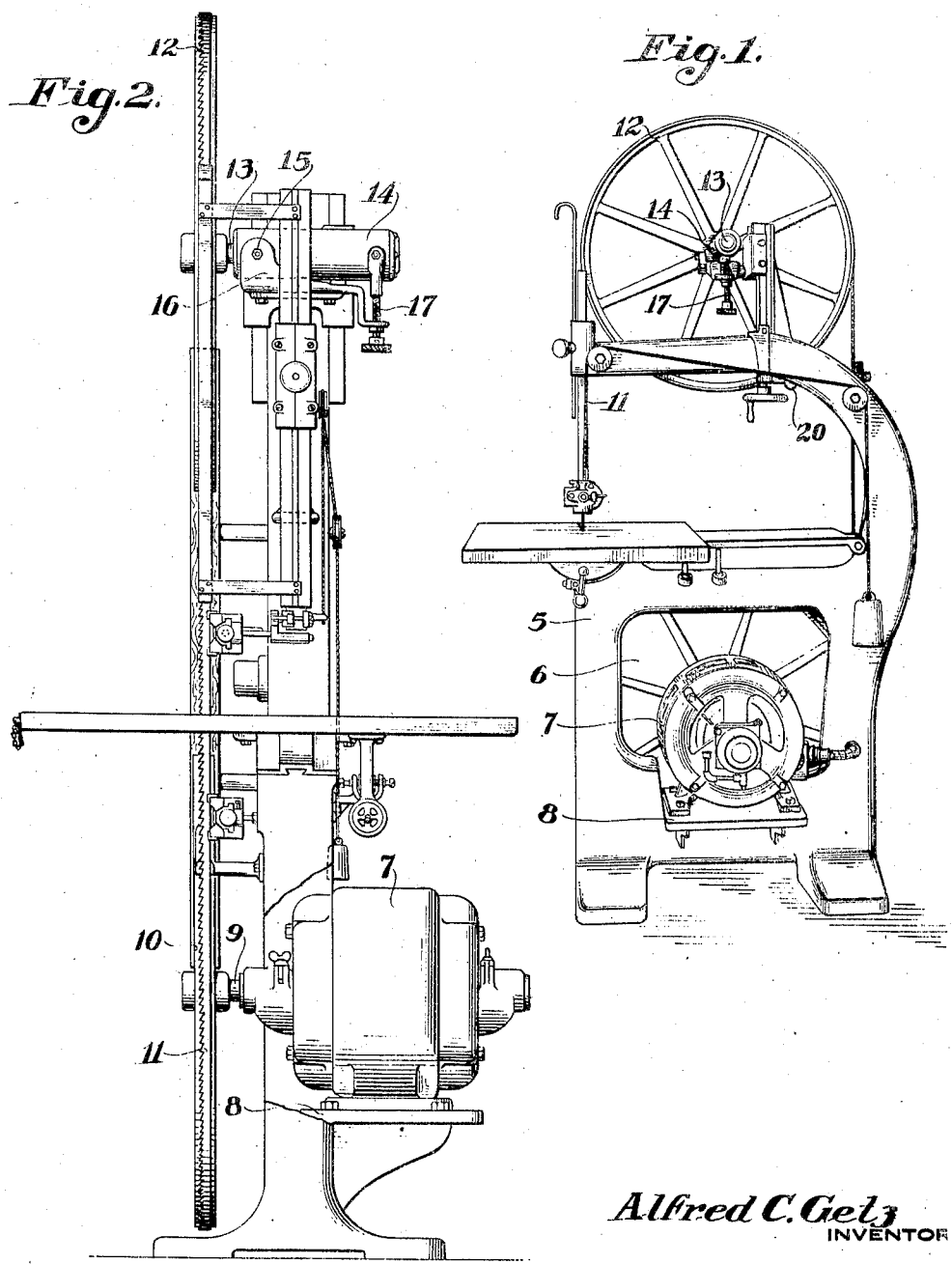

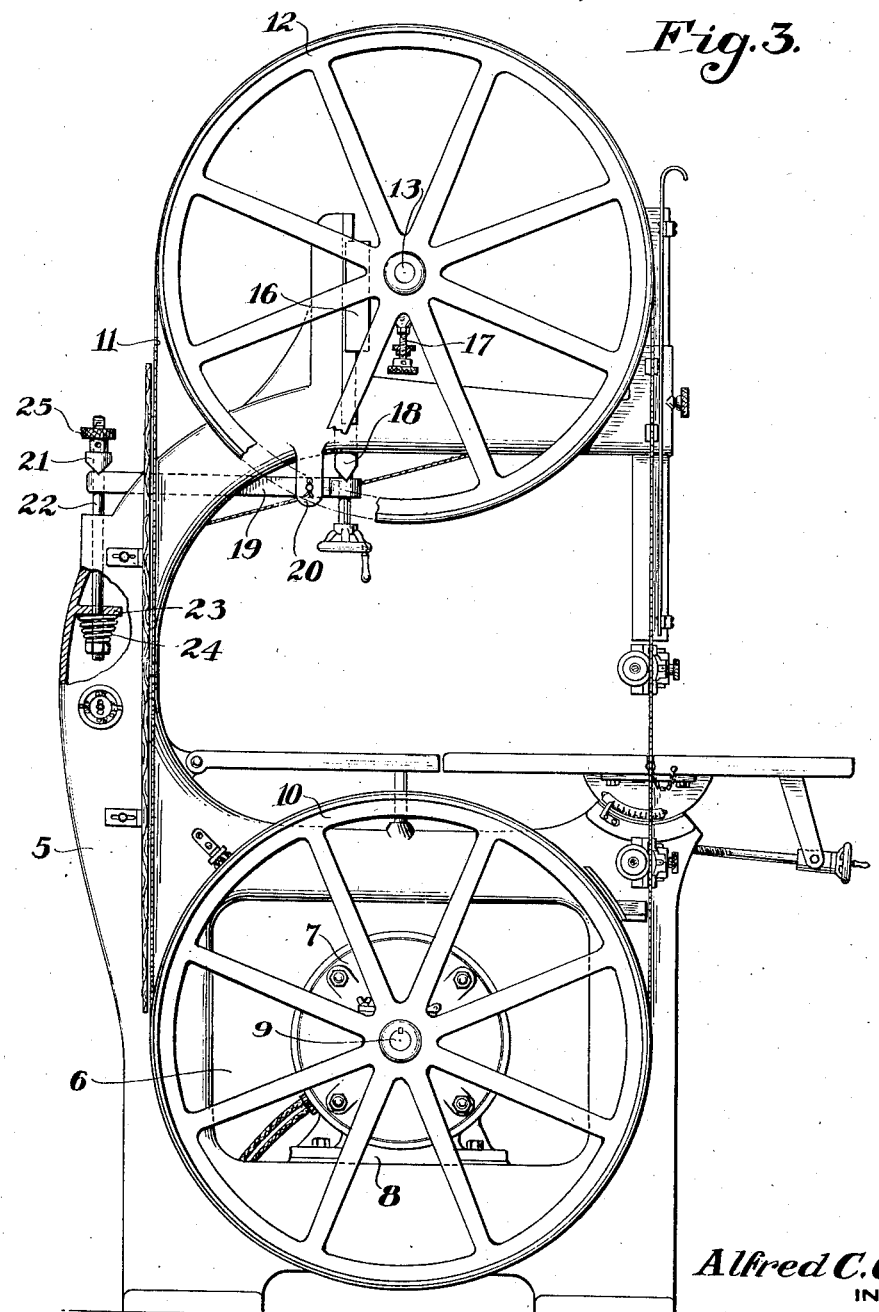

1,535,995

UNITED STATES PATENT OFFICE.

ALFRED C. GETZ, OF SIDNEY, OHIO, ASSIGNOR TO THE SIDNEY MACHINE TOOL COMPANY, OF SIDNEY, OHIO, A CORPORATION OF OHIO.

BAND SAW.

Application filed October 22, 1923. Serial No. 670,160.

*To all whom it may concern:*

Be it known that I, ALFRED C. GETZ, a citizen of the United States, residing at Sidney, in the county of Shelby and State of Ohio, have invented a new and useful Band Saw, of which the following is a specification.

This invention relates to band saws, and particularly to an improved mechanism for supporting and driving the same.

The general object of the invention is to provide a compact and practical arrangement, whereby the lower band wheel is mounted directly on the motor shaft and closely adjacent to the motor housing, which in turn is supported within the saw frame casting, and the weight of the lower wheel is supported by the band saw blade and upper band wheel, so that practically no weight is imposed upon the motor shaft bearings, wear on the latter is thereby prevented, and the friction load on the shaft and bearings is practically eliminated. In addition to this feature, the upper wheel is resiliently supported by novel means including a spring housed within the frame which cooperates with the upper wheel to equalize the tension on the saw blade, and regulate the upward force exerted against the lower wheel.

The invention will be more fully described in connection with the accompanying drawings, which illustrate the preferred form of the invention.

In the drawings:

Figure 1 is a perspective view of the invention.

Figure 2 is a front elevation thereof.

Figure 3 is a side elevation thereof, with a portion shown in section.

The band saw mechanism is supported by a frame casting 5, the lower part of which is provided with a transverse opening 6 within which an electric motor 7 is supported at one side of said frame upon a shelf or bracket 8 formed integral with the frame 5 at the bottom of the opening. The base of the motor is supported solely on the bracket, and is detachably secured to said bracket and may be readily removed therefrom in case of motor troubles, without dismantling the machine. Any standard motor may be used. Secured to the motor shaft 9, which passes through said opening 6 to the opposite side of said frame, is a lower wheel 10, around which passes the band saw blade 11, which is driven thereby. The upper portion of the band saw blade passes over the upper wheel 12, which is secured to a shaft 13 journaled within a sleeve 14. This sleeve is pivoted at 15 to a bracket 16, and is adapted to be adjusted about its pivot by a screw 17, in order to adjust the shaft 13 and aline the wheel 12 with the lower wheel 10.

The bracket 16, which supports the upper wheel, is mounted for vertical adjustment on a slide bar 18, which is vertically slidable in guideways formed in the head of the frame casting. The slide bar 18 is supported at its lower end upon the inner end of a lever 19, which is intermediately pivoted to a depending bracket 20, which forms an integral part of the casting 5. The outer end of the lever 19 extends through and beyond the frame casting, where it is engaged by the lower edge of a head 21 adjustably secured to a bolt 22, which extends downwardly into the frame casting and is slidable therein. The lower end of the bolt 22 passes through an internal flange 23 formed in the casting, and is urged downwardly by an expansile coiled spring 24. The tension of the spring may be readily adjusted by means of an upper nut 25 at the upper end of the bolt.

The spring through its described connections with the movably mounted upper wheel is set at such a tension as to keep the blade tight on both the lower and the upper wheels and thus carry the weight of the lower wheel, and this relieves any weight on the bearings of the motor, and takes care of a great deal of friction.

The work table and saw guide form no part of the invention, and a detailed description thereof is deemed unnecessary.

The head 21, which is urged downwardly by the spring 24 tends to rock the inner end of the lever 19 upwardly to raise the shaft 13 and upper wheel 12, and to tension the band saw blade 11. The force exerted upwardly against the hand saw blade also tends to lift the lower wheel, and to relieve the weight thereof from the bearings of the motor shaft. Thus, the pressure of the shaft 9 upon the bearings, due to the weight of the wheel 10, is practically eliminated, and the rotation of the shaft in its bearings is almost frictionless. The arrangement of the motor 7 within the frame also permits the wheel 10 to be mounted on the motor shaft closely adjacent to the motor housing, so that the operation of the machine is free from vibration, and a strong easy running machine is obtained.

Among the advantages of this invention may be mentioned the following:

The invention dispenses with all supplementary bearings of the lower band saw wheel, and there are no belts, pulleys, gearing or couplings to create friction, or to become loose and slip. There is no lost motion, and wear is reduced to a minimum because there is practically no weight upon the motor shaft bearings. The elimination of all gearing lessens the danger of the operator having his clothes caught when the machine is in operation. The breakage of band saw blades, often due to the sudden jerking of belts or chains, is also avoided.

While I have shown and described specifically the structure of the machine, it is to be understood that this is merely for the purpose of illustrating the principles of the invention, and that the latter is capable of being used with any other type of machine without departing from the salient features of the invention or sacrificing any of its advantages.

What is claimed is:

In a band saw machine, the combination of a frame having its lower part provided with a transverse opening, a bracket formed integral with the frame at the bottom of said opening, a motor mounted solely and detachably on said bracket at one side of the said frame and having its drive shaft projecting through said opening to the opposite side of said frame, a lower band wheel rigidly secured to the outer end of said drive shaft, an upper band wheel, and a saw blade carried by said wheels whereby the motor may be removed without dismantling the machine.

In testimony that I claim the foregoing as my own, I have hereto affixed my signature.

ALFRED C. GETZ.